(12) United States Patent
Hwang et al.

(10) Patent No.: US 10,885,335 B2
(45) Date of Patent: Jan. 5, 2021

(54) ELECTRONIC DEVICE AND CONTROLLING METHOD THEREOF

(71) Applicant: SAMSUNG ELECTRONICS CO., LTD., Suwon-si (KR)

(72) Inventors: Sang Young Hwang, Suwon-si (KR); Woo Mok Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 93 days.

(21) Appl. No.: 16/224,742

(22) Filed: Dec. 18, 2018

(65) Prior Publication Data

US 2019/0213415 A1 Jul. 11, 2019

(30) Foreign Application Priority Data

Jan. 8, 2018 (KR) .................. 10-2018-0002470

(51) Int. Cl.
*G06K 9/00* (2006.01)
*G06F 3/0484* (2013.01)

(52) U.S. Cl.
CPC ....... *G06K 9/00671* (2013.01); *G06F 3/0484* (2013.01)

(58) Field of Classification Search
None
See application file for complete search history.

(56) References Cited

U.S. PATENT DOCUMENTS

| 4,490,660 A * | 12/1984 | Tsuchihashi ........... B25J 19/023 250/559.33 |
| 8,731,276 B2 * | 5/2014 | Mizutani ................ B25J 9/1676 345/633 |
| 9,041,800 B2 * | 5/2015 | Bell ....................... H04N 7/181 348/143 |
| 9,522,471 B2 | 12/2016 | Kuffner, Jr. et al. |

(Continued)

FOREIGN PATENT DOCUMENTS

| EP | 2 380 709 A2 | 10/2011 |
| JP | 2017-100205 | 6/2017 |

(Continued)

OTHER PUBLICATIONS

International Search Report and Written Opinion dated Apr. 5, 2019, issued in International Application No. PCT/KR2018/016181.

(Continued)

*Primary Examiner* — Feng Niu
(74) *Attorney, Agent, or Firm* — Nixon & Vanderhye P.C.

(57) ABSTRACT

Disclosed is an electronic device. The electronic device includes a display; a camera; a sensor; a storage configured to store position information and work information of a smart machine; and a processor configured to identify a smart machine which is located within a peripheral area of the electronic device based on position information of the electronic device sensed through the sensor and position information of the smart machine stored in the storage, to obtain work information of the identified smart machine from the storage, and to indicate a work area of the smart (Continued)

machine on an image photographed through the camera based on the obtained work information of the smart machine and provide the image including the work area on the display.

20 Claims, 10 Drawing Sheets

(56) References Cited

U.S. PATENT DOCUMENTS

| | | | |
|---|---|---|---|
| 9,908,244 B2 | 3/2018 | Burmeister et al. | |
| 10,548,667 B2* | 2/2020 | Flett | A61B 90/361 |
| 2004/0260563 A1 | 12/2004 | Hashimoto et al. | |
| 2005/0055134 A1* | 3/2005 | Okuda | B25J 9/1666 |
| | | | 700/245 |
| 2005/0207618 A1* | 9/2005 | Wohler | B25J 19/06 |
| | | | 382/103 |
| 2011/0311127 A1* | 12/2011 | Mizutani | B25J 9/1676 |
| | | | 382/153 |
| 2012/0182155 A1* | 7/2012 | Sato | B25J 9/1674 |
| | | | 340/686.6 |
| 2012/0293506 A1* | 11/2012 | Vertucci | G06N 3/04 |
| | | | 345/419 |
| 2013/0201292 A1* | 8/2013 | Walter | F16P 3/14 |
| | | | 348/47 |
| 2015/0045949 A1* | 2/2015 | Hashiguchi | B25J 9/161 |
| | | | 700/253 |
| 2015/0049911 A1* | 2/2015 | Doettling | G06T 7/285 |
| | | | 382/103 |
| 2015/0352719 A1* | 12/2015 | Nakazato | B25J 9/1674 |
| | | | 700/253 |
| 2016/0184998 A1 | 6/2016 | Amagata | |
| 2016/0229068 A1 | 8/2016 | Haman et al. | |
| 2016/0271800 A1 | 9/2016 | Stubbs et al. | |
| 2016/0350589 A1 | 12/2016 | Chiu | |
| 2017/0001317 A1* | 1/2017 | Katayama | H05B 47/10 |
| 2017/0100838 A1 | 4/2017 | Lewis | |
| 2017/0197313 A1 | 7/2017 | Nishino | |
| 2017/0206710 A1 | 7/2017 | Touma et al. | |
| 2017/0320212 A1 | 11/2017 | Frisk et al. | |
| 2017/0372139 A1* | 12/2017 | Thomasson | B25J 9/1671 |
| 2018/0133896 A1* | 5/2018 | Kuffner | H04W 4/30 |
| 2018/0201444 A1* | 7/2018 | Welty | G06Q 10/08 |
| 2018/0268218 A1* | 9/2018 | Watanabe | G02B 27/0172 |
| 2018/0285672 A1* | 10/2018 | Yamaya | G06K 9/3233 |
| 2019/0030721 A1* | 1/2019 | Hoshiyama | B25J 9/1697 |
| 2019/0112134 A1* | 4/2019 | Ooba | G05B 19/4182 |

FOREIGN PATENT DOCUMENTS

| | | |
|---|---|---|
| JP | 2017-520419 | 7/2017 |
| JP | 2017-144542 | 8/2017 |

OTHER PUBLICATIONS

European Search Report dated Jul. 28, 2020 for EP Application No. 18898058.5.

* cited by examiner

FIG. 5

WORK INFORMATION OF SMART MACHINE

| MANUAL | AUTOMATIC |
|---|---|
| - WHETHER SMART MACHINE IS FIXED (Y/N)<br>- MAX/MIN OUTPUT TORQUE<br>- MAX/MIN SPEED<br>- TYPES OF OPERATIONS<br>  (Grab, Pierce, Release, Move, etc.)<br>- WORK AREA BY OPERATIONS(W, H)<br>- REQUIRED TIME FOR OPERATIONS | - RECEIVE WORK INFORMATION FROM SERVER<br>- IDENTIFY WORK INFORMATION OF SMART<br>  MACHINE THROUGH CAMERA IMAGE ANALYSIS<br>  (IDENTIFY ARM NUM ER, AXIS NUMBER,<br>  AND WHEEL) |

ELECTRONIC DEVICE AND CONTROLLING METHOD THEREOF

CROSS-REFERENCE TO RELATED APPLICATION

This application is based on and claims priority under 35 U.S.C. § 119 to Korean Patent Application No. 10-2018-0002470, filed in the Korean Intellectual Property Office on Jan. 8, 2018, the disclosure of which is incorporated by reference herein in its entirety.

BACKGROUND

1. Field

The disclosure relates generally to an electronic device and a controlling method thereof, and, for example, to an electronic device including information on a smart machine and a controlling method thereof.

2. Description of Related Art

Recently, various types of industrial robots have been developed and distributed for automated and unmanned factory production.

Particularly, articulated robots that have a joint system similar to human joints and can operate similar to human limbs, and automatic guided vehicles that conveniently transport various materials used in the production process are representative industrial robots.

The penetration rate and utilization rate of industrial robots have been increasing, whereas, research and development of safety facilities for protecting users from industrial robots is somewhat inadequate. Thus, there are problems of accidents due to the use of industrial robots without proper safety facilities. In addition, disposing a physical fence in a dangerous area around the industrial robot may cause a restriction on the control of the industrial robot, requiring a lot of time and cost.

Accordingly, there is a need to develop a method in which a dangerous area and a safe area around the industrial robot can be easily and conveniently recognized by a worker.

SUMMARY

An aspect of the example embodiments relates to an electronic device which identifies a smart machine and provides a dangerous area, and a controlling method thereof.

The electronic device according to an example embodiment includes a display; a camera; a sensor; a storage configured to store position information and work information of a smart machine; and a processor configured to identify a smart machine which is located at a peripheral area of the electronic device based on position information of the electronic device sensed through the sensor and position information of the smart machine stored in the storage, to obtain work information of the identified smart machine from the storage, and to indicate a work area of the smart machine to an image photographed through the camera based on the obtained work information of the smart machine and to provide the image including the work area on the display.

The processor may identify the smart machine based on position information of the electronic device and a photographing direction of the electronic device sensed through the sensor.

The work information of the smart machine may include a work schedule of the smart machine and information on a work area which is required to perform an operation included in the work schedule, wherein the processor may, based on the work schedule of the smart machine, identify whether the smart machine is operating, and if it is identified (determined) that the smart machine is operating, indicate and provide a work area corresponding to operations of the smart machine based on information on the work area.

The processor may, when it is identified that the smart machine is operating, provide information on a remaining time until operations of the smart machine end based on the work schedule, and if it is identified that the smart machine is not operating, provide information on the remaining time until operations of the smart machine start.

The work information may include information on at least one of an operation of the smart machine obtained by analyzing an image of the smart machine photographed during a predetermined time, required time for the operation, and stand-by time between the operations.

The electronic device may further include a projector, and the processor may control the projector to irradiate a first beam to a work space of the smart machine based on work information of the identified smart machine.

The processor may control the projector to irradiate a second beam which guides a recognizable position regarding at least one of a motion and voice of the user based on information of a distance that the smart machine is capable of recognizing at least one of a user's motion or voice.

The electronic device may further include a driving unit including driving circuitry configured to move a main body of the electronic device, wherein the processor is configured to control the driving unit so that the electronic device is positioned within a predetermined distance from a user of the electronic device, and in response to position information of the electronic device being changed according to control of the driving unit, identify a smart machine located at a peripheral area of the electronic device.

The processor may, based on information of a distance that the smart machine is capable of recognizing at least one of a user's motion and voice, provide a UI for guiding a recognizable position of at least one of the user's motion and voice.

The storage may include coordinate information which indicates each position of a specific space, wherein position information of the electronic device includes information which indicates a position of the electronic device disposed within the specific space based on the coordinate information, and wherein position information of the smart machine includes information that indicates a position of the smart machine disposed within the specific space based on the coordinate information.

A controlling method of an electronic device storing position information and work information of a smart machine includes sensing position information of the electronic device; identifying a smart machine which is located at a peripheral area of the electronic device based on position information of the electronic device sensed through the sensor and position information of the smart machine stored in the storage; obtaining work information of the identified smart machine from the storage; and indicating a work area of the smart machine to an image photographed through the camera based on the obtained work information of the smart machine and displaying the image including the work area.

The identifying may include identifying the smart machine based on position information of the electronic device and a photographing direction of the electronic device that is sensed through the sensor.

The work information of the smart machine may include information on a work schedule of the smart machine and a work area which is required to perform an operation included in the work schedule, based on the work schedule of the smart machine, identifying whether the smart machine is operating; and wherein the displaying may include, if it is identified that the smart machine is operating, indicating and providing a work area corresponding to operations of the smart machine based on information on the work area.

The displaying may include, when it is identified that the smart machine is operating, displaying information on remaining time until operations of the smart machine end based on the work schedule, and if it is identified that the smart machine is not operating, displaying information on the remaining time until operations of the smart machine start.

The work information may include information on at least one of an operation of the smart machine obtained by analyzing an image of the smart machine photographed during a predetermined time, required time for the operation, and stand-by time between the operations.

The method may further include irradiating first beam to a work space of the smart machine based on work information of the identified smart machine.

The method may further include irradiating a second beam which guides a recognizable position regarding at least one of the motion and voice of the user based on information of a distance that the smart machine is capable of recognizing at least one of a user's motion or voice.

The method may include moving a main body of the electronic device so that the electronic device is positioned within a predetermined distance from a user of the electronic device, wherein the identifying may include, in response to position information of the electronic device being changed according to control of the driving unit, identifying a smart machine located at a peripheral area of the electronic device.

The displaying may include, based on information of a distance that the smart machine is capable of recognizing at least one of a user's motion and voice, displaying a UI for guiding a recognizable position of at least one of the user's motion and voice.

The electronic device may include coordinate information which indicates each position of a specific space as coordinates, wherein position information of the electronic device includes information which indicates a position of the electronic device disposed within the specific space based on the coordinate information, and wherein position information of the smart machine includes information that indicates a position of the smart machine disposed within the specific space based on the coordinate information.

According to various example embodiments as described above, the electronic device provides a virtual fence according to an operation of a smart machine and thus, there is the effect of making a user recognize a dangerous area.

BRIEF DESCRIPTION OF THE DRAWINGS

The above and/or other aspects, features and advantages of certain embodiments of the present disclosure will be more apparent from the following detailed description, taken in conjunction with the accompanying drawings, in which:

FIG. 5 is a diagram illustrating an example method for providing a work area according to an example embodiment;

DETAILED DESCRIPTION

Figure 1:
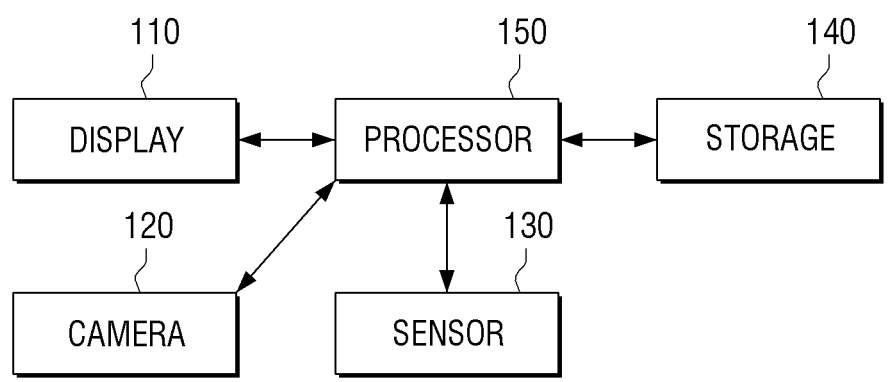
FIG. 1 is a block diagram illustrating an example configuration of an electronic device according to an example embodiment.

Certain example embodiments are described in greater detail below with reference to the accompanying drawings.

The terms used in the present disclosure are general terms which are widely used now and selected considering the functions of the present disclosure. However, the terms may vary depending on the intention of a person skilled in the art, a precedent, or the advent of new technology. In addition, in a special case, terms may be arbitrarily selected. In this case, the meaning of the terms will be explained in the corresponding disclosure. Accordingly, defining the terms used herein will be based on the meanings of the terms and overall contents of example embodiments, rather than simple names of the terms.

As various example embodiments may have a variety of modifications and several examples, certain embodiments will be exemplified in the drawings and described in greater detail in the disclosure. However, this does not necessarily limit the scope of the embodiments to a specific embodiment form. Instead, modifications, equivalents and replacements included in the disclosed concept and technical scope of this disclosure may be employed. While describing embodiments, if it is determined that the specific description regarding a known technology obscures the gist of the disclosure, the specific description may be omitted.

In the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they do not exclude the possibilities of combination or addition of one or more features, numbers, steps, operations, elements, parts or a combination thereof.

According to embodiments, a "module" or "unit" performs at least one function or operation, and may be implemented as hardware or software, or any combination of hardware and software. In addition, a plurality of 'modules' or a plurality of 'units' may be integrated into at least one module and may be realized as at least one processor except for 'modules' or 'units' that should be realized in a specific hardware.

Hereinbelow, certain example embodiments will be described in greater detail with reference to the accompanying drawings to enable those skilled in the art to understand the same with ease. However, the various example embodiments may be realized in a variety of different configurations, and not limited to descriptions provided herein. Similar drawing reference numerals are used for the similar elements throughout the disclosure.

FIG. 1 is a block diagram illustrating an example configuration of an electronic device according to an example embodiment.

Referring to FIG. 1, an electronic device 100 includes a display 110, a camera 120, a sensor 130, a storage 140, and a processor (e.g., including processing circuitry) 150.

The electronic device 100 according to an embodiment of the present disclosure may be implemented as various devices such as, for example, and without limitation, a user terminal device, a display device, a set-top box, a tablet personal computer, a smart phone, an e-book reader, a desktop PC, a laptop PC, a workstation, a server, a personal digital assistant (PDA), a portable multimedia player (PMP), an MP3 player, or the like. However, this is merely an example, and the electronic device 100 may be implemented as various types of electronic devise such as, for example, and without limitation, a wearable device that is in at least one type of an accessory type (for example: watch, ring, bracelet, ankle bracelet, necklace, glasses, contact lens, or a head-mounted-device (HMD)), an integrated type with fabric and/or clothes (for example: an electronic cloth), a robot including a driving unit, a projector, a server, or the like.

The display 110 may display various screens. The display 110 may be implemented as various types of displays such as, for example, and without limitation, a liquid crystal display (LCD), organic light emitting display (OLED), liquid crystal on silicon (LCoS), digital light processing (DLP), or the like. The present disclosure is not limited thereto and can be implemented as various types of displays 110 which can display a screen.

The display 110 may also be coupled to at least one of a front region, a side region, and a back region of the electronic device 100 in the form of a flexible display.

The camera 120 may include various circuitry including a configuration for capturing a still image or a moving image under the control of the user. The camera 120 can capture a still image at a specific point of time, but may also continuously photograph a still image. The camera 120 may provide the acquired image to the processor 150 and the image may be provided to the user via the display 110. The camera 120 may be implemented as a plurality of cameras such as a front camera and a back camera.

The sensor 130 may be implemented as any of various sensors, such as, for example, and without limitation, a position sensor, a touch sensor, a geomagnetic sensor, a gyro sensor, an acceleration sensor, a proximity sensor, a grip sensor, or the like. However, the present disclosure is not limited thereto, and the sensor 130 may be implemented by various types of sensors 130 that can sense the state of the electronic device 100, the surrounding environment of the electronic device 100, and so on.

For example, the sensor 130 may sense position information of the electronic device 100. As an example, the electronic device 100 may sense position information of the electronic device using a GPS sensor. In addition, the sensor 130 may sense the photographing direction of the electronic device 100. In an example, the sensor 130 may sense the direction pointed by the back surface of the electronic device 100. The direction pointed by the rear surface of the electronic device 100 sensed by the sensor and the photographing direction of the rear surface camera provided in the electronic device 100 may be the same.

The storage 140 may store various data such as operating system (O/S) software module to drive the electronic device 100, various applications, contents, position information of a smart machine and work information of the smart machine, and so on.

The smart machine may refer, for example, and without limitation, to an industrial robot used in the manufacturing process of a product such as a factory line. For example, industrial robots can be implemented as articulated robots to replace the functions of the human arms or hands. Industrial robots may refer, for example, to all types of robots used for various purposes in the industrial field such as, for example, and without limitation, assembly, machining, warehousing/shipment of articles, inspection & measurement, press, resin processing, welding, and the like. For example, an industrial robot may be implemented as a rectangular coordinate robot, a cylindrical work robot, or a polar robot. Hereinafter, for convenience of description, a smart machine is assumed to be an industrial robot. However, this is merely an example, and the smart machine may be realized as a robot that operates in an autonomous manner by sensing ambient environment in real time based on the sensor 130 and collecting information.

The storage 140 may store location information and work information of the smart machine. For example, the storage 140 may include coordinate information indicating coordinates of each position of a specific space such as, for example, and without limitation, a factory, a warehouse, a building, or the like. The location information of the smart machine may be information indicating the location of the smart machine disposed in the specific space based on the coordinate information. For example, the location of the smart machine may include information represented by (x, y, z) coordinates, and the electronic device 100 can identify the location where the smart machine is located in a specific space according to the information.

In addition, the storage 140 may store work information of the smart machine. The work information may include information on a work schedule required for performing operations included in the work schedule of the smart machine and a work schedule. The work area may refer, for example, to the size of the space. In an example, the smart machine may perform a first operation, and the storage 140 may store information about the size of the space required to perform the first operation in the form of (w, h). Here, w may be the width of the space required to perform the first operation and h may be the height of the space required to perform the first operation. However, various types of information capable of identifying the size of the space required for the operation of the smart machine can be stored.

The operations performed by the smart machine can be variously set according to the purpose of the smart machine. As a non-limiting example, a smart machine may perform operations such as grab, pierce die, stock & release, move, and the like. One smart machine may perform different operations sequentially according to a schedule, or one smart machine may perform only one operation repeatedly according to a schedule.

The work schedule according to an example embodiment may refer, for example, and without limitation, to a list of operations performed by the smart machine according to time order. The smart machine can perform an operation based on the job schedule. This will be described in greater detail below with reference to FIG. 4.

The processor 150 may include various processing circuitry and may control overall operations of the electronic device 100.

According to an example embodiment, the processor 150 may include various processing circuitry, such as, for example, and without limitation, one or more of a central processor (CPU), a dedicated processor, a microcontroller unit (MCU), a micro processor (MPU), a controller, an application processor (AP), a communication processor (CP), an ARM processor, or the like. The processor 150 may be implemented as a system on chip (SoC) with a built-in processing algorithm, a large scale integration (LSI), or a field programmable gate array (FPGA).

The processor 150 according to an embodiment of the present disclosure may identify a smart machine located in a peripheral area of the electronic device based on the position information of the electronic device 100 sensed through the sensor 130 and the position information of the smart machine. Here, the ambient area may refer, for example, to an area within a predetermined distance from the electronic device 100.

According to an example embodiment, the processor 150 may identify the location of the electronic device 100 in accordance with the location information of the electronic device 100 sensed by the sensor 130, and identify a smart machine located within a predetermined distance from the location of the electronic device 100. The processor 150 may obtain the work information of the smart machine identified from the storage 140. For example, the processor 150 may identify first and second smart machines located in a peripheral region (e.g., a region within a given distance of the electronic device) of the electronic device 100 among a plurality of smart machines. The processor 150 may obtain the first work information corresponding to the first smart machine and the second work information corresponding to the second smart machine.

As another example, a mark may be placed in the specific space where the electronic device 100 and the smart machine are located to identify each location in, for example, the lower or upper portion of the space. For example, in the floor of the factory, a mark, an identification mark, etc. for each predetermined distance, area, and compartment can be disposed. The electronic device 100 may acquire the location information of the electronic device 100 and the location information of the smart machine based on the mark.

The processor 150 according to an embodiment of the present disclosure may indicate the work area of the smart machine on the image photographed through the camera 120 based on the obtained smart machine operation information and provide it on the display. For example, the processor 150 may identify an area corresponding to the position of the first smart machine based on coordinate information (x1, y1, z1) according to the position of the first smart machine in the photographed image, and shade the region corresponding to the (w1, h1) in a specific color and provide the image including the shaded region through the display 110.

Accordingly, the user can receive the work area of the first smart machine through the electronic device 100 as augmented reality (AR). An area shaded with a specific color on the display 110 may indicate an area where the user's access is dangerous due to the operation of the first smart machine. Without installation of a physical fence, a virtual safety fence can be provided to a user to prevent and/or reduce the possibility of an accident.

The processor 150 according to an embodiment of the present disclosure may identify the smart machine based on the location information of the electronic device 100 and the photographing direction of the electronic device 100. In an example, the sensor 130 may sense the direction of movement of the electronic device 100, the direction of photographing of the camera 120 (e.g., a back camera), and the processor 150 may identify smart machines based on the sensed direction.

The processor 150 may identify a plurality of smart machines located in a peripheral region of the electronic device 100 based on the location information of the electronic device 100 and identify a smart machine corresponding to the photographing direction among the plurality of smart machines. For example, if the smart machine corresponding to the photographing direction of the electronic device 100 among the identified first and second smart machines is the first smart machine, the processor 140 may indicate the work area based on the work information of the first smart machine. Here, the work area may refer, for example, to a width and a height (w1, h1) indicating a required area as the first smart machine operates.

The processor 150 in accordance with an example embodiment of the present disclosure may identify whether a smart machine is operating based on a work schedule of the smart machine. However, in an example embodiment, the processor 150 may identify whether the smart machine is performing an operation based on the image photographed through the camera 120, in addition to the work schedule. The processor 150 may indicate and provide a work area if the smart machine is identified as being operational. The work schedule may include at least one of an operation of the smart machine, a time required for the operation, and a stand-by time between operations.

The processor 150 according to an example embodiment, if it is identified that the smart machine is operating, may provide information on a remaining time until an operation of the smart machine is ended.

According to another example embodiment, if it is identified that the smart machine is not operating, information on a remaining time until the operation of the smart machine starts can be provided.

As a non-limiting example, it can be assumed that the smart machine operates between time t1 and time t2. The processor 150 may, based on the work schedule, provide information about the time remaining until time t2 if the smart machine is identified as being operational. As another example, if the smart machine is identified as not operating, it may provide information about the time remaining until time t1.

The processor 150 according to an example embodiment of the present disclosure can acquire work information by analyzing an image of the smart machine taken through the camera 120 for a preset time. For example, the processor 150 may analyze an image captured by the smart machine for a predetermined time to acquire at least one of the operation time of the smart machine, the required time for the operation and the waiting time between operations, thereby obtaining work information. However, in an example embodiment, the processor 150 may acquire work information of the smart machine according to various methods, and store the acquired work information in the storage 140. A description thereof will be described in greater detail below with reference to FIG. 4.

The processor 150 may update the smart machine's work information by analyzing the image of the smart machine photographed for a preset time. As a non-limiting example, according to the work schedule stored in the storage 140, the smart machine may operate between times t1 and t2, and may operate between times t3 and t4. On the other hand, according to the image photographed for a predetermined time, the smart machine operates between time t2 and t3, and can operate between times t4 and t5. Accordingly, the processor 150 may update the task information for the smart machine stored in the storage 140, replace it with the updated work information, and store the updated work information.

Figure 2:
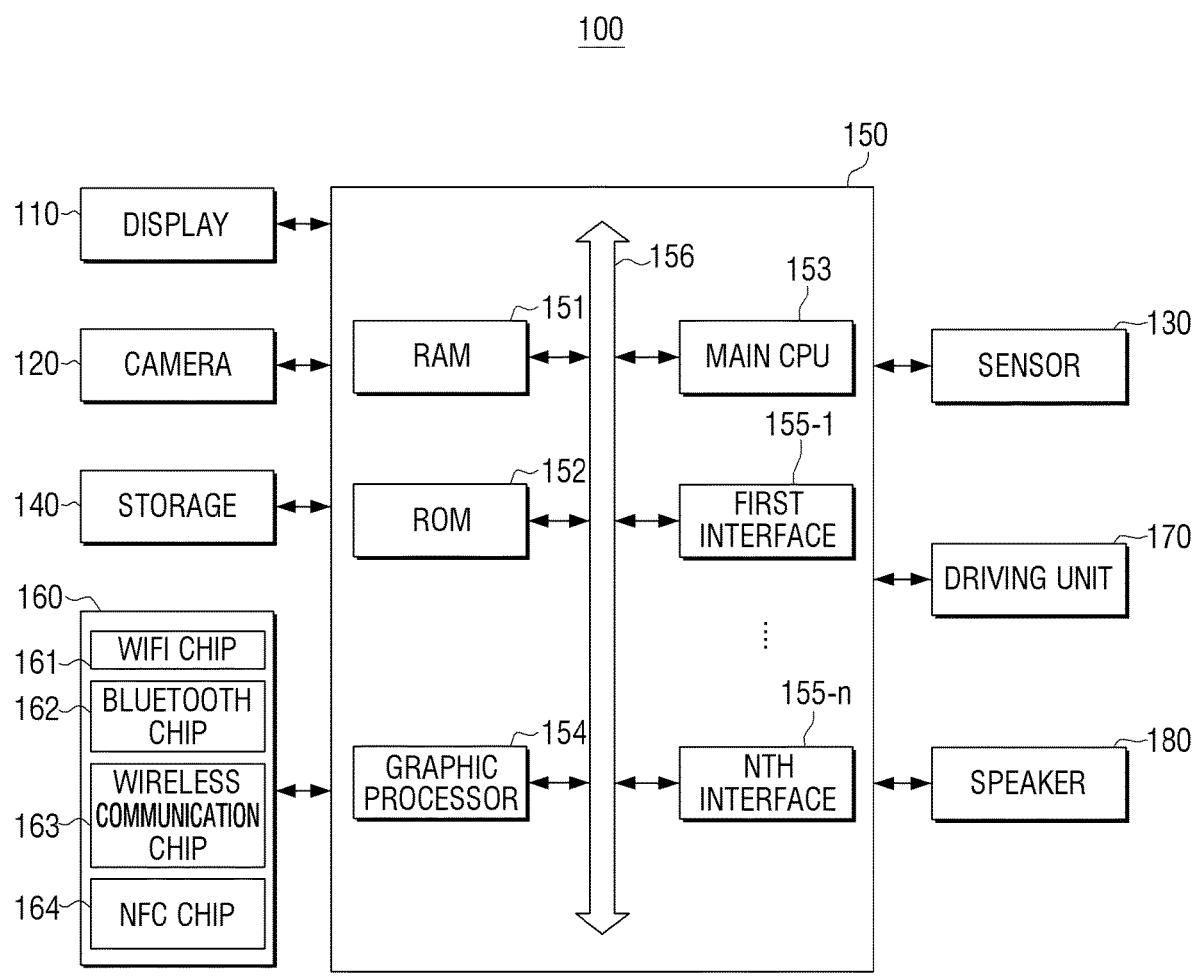
FIG. 2 is a block diagram illustrating an example configuration of the electronic device according to an example embodiment.

FIG. 2 is a block diagram illustrating an example configuration of the electronic device according to an example embodiment.

Referring to FIG. 2, the electronic device 100 includes a display 110, a camera 120, a sensor 130, a storage 140, a processor (e.g., including processing circuitry) 150, a communication unit (e.g., including communication circuitry) 160, a driving unit (e.g., including driving circuitry) 170, and a speaker 180. A detailed description of the components shown in FIG. 2 will not be repeated for the parts overlapping the components shown in FIG. 1.

The camera 120 may include, for example, a lens, a shutter, a diaphragm, a solid-state image photographing device, an analog front end (AFE), a timing generator (TG), and the like. The shutter adjusts the time the light reflected from the subject enters the user terminal device 100, and adjusts the amount of light incident on the lens by mechanically increasing or decreasing the size of the aperture through which the light enters. The solid-state image photographing device outputs an electric signal as an image due to the photoelectric charge when light reflected on the object is accumulated in the photo-electric charge. The TG outputs a timing signal for reading out the pixel data of the solid-state image pickup device, and the AFE samples the electric signal output from the solid-state image pickup device and digitizes the electrical signal.

The sensor 130 may include various sensor circuitry and may be implemented, for example, and without limitation, as a GPS sensor, a touch sensor, a geomagnetic sensor, a gyro sensor, an acceleration sensor, a proximity sensor, a grip sensor, or the like.

The touch sensor may be implemented, for example, and without limitation, as an electrostatic touch sensor, a pressure sensitive touch sensor, or the like. The electrostatic touch sensor may refer, for example, to a sensor that uses a dielectric coated on the surface of a display to calculate touch coordinates by sensing minute electricity that is excited by the user's body when a part of the user's body touches the display surface. The pressure sensitive type touch sensor may include, for example, and without limitation, two electrode plates built in the electronic device 100. When the user touches the upper and lower plates of the touched point, the pressure sensitive type touch sensor senses that the current flows. In addition, various other touch sensing circuitry, such as, for example, and without limitation, infrared sensing, surface ultrasonic conduction, integral tension measurement, piezo effects, or the like, may be used to detect touch interactions.

In addition, the electronic device 100 may use various other touch sensing circuitry, such as, for example, and without limitation, a magnetic and magnetic field sensor, a light sensor, a proximity sensor, or the like, instead of the touch sensor to determine whether or not the touch object such as, for example, a finger or a stylus pen has come into contact with or in proximity to the touch object.

The geomagnetic sensor may refer, for example, to a sensor for sensing the rotating state and the moving direction of the electronic device 100, and the like. The gyro sensor may refer, for example, to a sensor for sensing the rotation angle of the electronic device 100. Both the geomagnetic sensor and the gyro sensor may be provided, but even if only one of them is provided, the user terminal device 100 can detect the rotation state.

The acceleration sensor may, for example, refer to a sensor for sensing the degree of tilting of the electronic device 100.

The proximity sensor may refer, for example, to a sensor for sensing the approaching motion without touching the display surface directly. The proximity sensor may be implemented as various types of sensors such as, for example, and without limitation, a high-frequency oscillation type that forms a high-frequency magnetic field and senses a current induced by a magnetic field characteristic that changes when approaching an object, a magnetic type using a magnet, a capacitive type which senses capacity which changes due to approach of the object, and the like.

The grip sensor may refer, for example, to a sensor that detects the grip of a user by being disposed on the rear surface, the rim, and the handle, separately from the touch sensor provided on the touch screen. The grip sensor may be implemented as a pressure sensor in addition to the touch sensor.

The storage 140 may be implemented as an internal memory such as a ROM or a RAM included in the processor 150 or may be implemented as a separate memory from the processor 150. In this case, the storage 140 may be implemented in the form of a memory embedded in the electronic device 100, or a removable memory in the electronic device 100, depending on the purpose of data storage. For example, in the case of data for driving the electronic device 100, it is stored in a memory embedded in the electronic device 100, and in the case of data for the extended function of the electronic device 100, the data can be stored in a memory which can be attached to or detached from the electronic device 100.

The memory embedded in the electronic device 100 may be implemented, for example, and without limitation, as a non-volatile memory, a volatile memory, a hard disk drive (HDD), or a solid state drive (SSD) A micro SD card, a USB memory, etc.), an external memory (for example, a USB memory) that can be connected to the USB port, and the like.

The processor 150 may include various processing circuitry and controls overall operations of the electronic device 100 using various programs stored in the storage 140.

For example, the processor 150 may include a RAM 151, a ROM 152, a main CPU 153, a graphic processor 154, first to nth interface 155-1~155-n, and a bus 156.

The RAM 151, the ROM 152, the main CPU 153, the graphic processor 154, and the first to nth interface 155-1~155-n can be interconnected through the bus 156.

The first through n interfaces 155-1 to 155-n may be connected to the various components described above. One of the interfaces may be a network interface connected to an external device via a network.

The main CPU 153 accesses the storage 140 and performs booting using the O/S stored in the storage 140. Then, various operations are performed using various programs stored in the storage 140.

The ROM 152 stores a command set for booting the system and the like. The main CPU 153 copies the O/S stored in the storage 140 to the RAM 151 according to the instruction stored in the ROM 152, executes the O/S to boot the system. When the booting is completed, the main CPU 153 copies various application programs stored in the storage 140 to the RAM 151, executes the application program copied to the RAM 151, and performs various operations.

The graphic processor 154 generates a screen including various objects such as an icon, an image, and a text using an operation unit (not shown) and a rendering unit (not shown). An operation unit (not shown) calculates an attribute value such as a coordinate value, a shape, a size, and a color to be displayed by each object according to the layout of the screen based on the received control command. The rendering unit (not shown) generates screens of various layouts including the objects based on the attribute values calculated by the operation unit (not shown). The screen generated in the rendering unit (not shown) is displayed within the display area of the display 110.

The operation of the processor 150 may be performed by executing a program stored in the storage 140.

The communicator 160 may include various communication circuitry and performs communication with various types of external devices according to various types of communication methods. The communicator 160 may include various communication circuitry, such as, for example, and without limitation, one or more of a Wi-Fi chip 161, a Bluetooth chip 162, wireless communication chip 163, an NFC chip 164, and so on. The processor 150 communicates with several external devices and smart machine using the communicator 160.

The Wi-Fi chip 161 and the Bluetooth chip 162 communicate with each other using WiFi or Bluetooth. When the WiFi chip 161 or the Bluetooth chip 162 is used, various connection information such as an SSID and a session key may be transmitted and received first, and communication information may be used to transmit and receive various information. The wireless communication chip 163 refers to a chip that performs communication according to various communication standards such as IEEE, Zigbee, 3rd Generation (3G), 3rd Generation Partnership Project (3GPP), Long Term Evolution (LTE). The NFC chip 164 means a chip operating in a Near Field Communication (NFC) mode using 13.56 MHz band among various RF-ID frequency bands such as 135 kHz, 13.56 MHz, 433 MHz, 860 to 960 MHz, and 2.45 GHz.

The processor 150 according to an embodiment of the present disclosure may communicate with a server (not shown) to obtain work information of a smart machine. For example, when the product name of the smart machine is input, the processor 150 receives the work information of the smart machine corresponding to the product name from the server through the communication unit 160, and stores the received work information in the storage 140. However, the present disclosure is not limited thereto, and may acquire work information of a smart machine through any suitable means, including, for example, and without limitation, a keyword search that characterizes a smart machine. For example, it is of course possible to search Pick & Place Robot, 6-axis multi-joint robot, and the like, and obtain and store work information from search results.

As another example, the processor 150 may communicate with a smart machine disposed nearby the electronic device 100 or within a predetermined scope through the Wi-Fi chip 161, Bluetooth chip 162, the NFC chip 164, etc. to obtain at least one of the position information and work information of the smart machine.

The driving unit 170 may include various driving circuitry for moving the main body of the electronic device 100. Generally, the driving unit 170 of the electronic device 100 may include left and right motors. The driving unit 170 may selectively move the left and right motors so that the main body of the electronic device 100 may be moved forward, backward, and rotated. In addition, the driving unit 170 may include a driving wheel and a castor. The driving wheels may be connected to the left and right motors so that two driving motors may be disposed symmetrically on the left and right edges of the central region of the lower portion of the main body of the electronic device 100. However, it should be understood that this may include various types of drivers that enable movement of the electronic device 100.

For example, the driving unit 170 may be driven such that the electronic device 100 is located within a predetermined distance from the user, under the control of the processor 150. For example, the processor 150 can detect the user and control the driving unit 170 to be positioned within a distance of 1 m from the sensed user. Even when the user moves, the electronic device 100 can detect the position of the changed user in real time and move to correspond to the position of the user.

According to an embodiment of the present disclosure, when the position information of the electronic device 100 is changed according to the control of the driving unit 170, the electronic device 100 may identify a smart machine located at a peripheral area of the electronic device 100 based on the changed position information. The electronic device 100 can identify, in real time, a smart machine located in the peripheral area of the user who is moving, taking into account the movement of the user, and provide an indication of the work area of the identified smart machine.

A projector (not shown) may, for example, irradiate a beam to the work space of the smart machine based on the work information of the identified smart machine. For example, in addition to providing an indication of a work area on a photographed image, the electronic device 100 may also irradiate the beam to the workspace of the identified smart machine and make the user to recognize the work area.

In an example, the projector may irradiate a first beam having a particular color in the work space of the smart machine. In order to make a user recognize the work area intuitively and prevent and/or reduce accidents, the projector can irradiate the workspace with a red beam.

The projector according to an example embodiment of the present disclosure may, based on distance information for recognizing at least one of a user's motion and a user's voice by the smart machine, irradiate the second beam which guides a recognizable position regarding at least one of the user's motion and voice. For example, the smart machine may recognize at least one of the user's motion and voice, and the electronic device 100 may include information about the minimum distance that the smart machine requires to recognize motion and voice without malfunction. The electronic device 100 may illuminate a second beam guiding the recognizable position to a user who wants to control the smart machine using at least one of motion and voice based on information about the minimum distance. For example, a green beam can be illuminated to distinguish it from the working area of a smart machine.

The projector according to an example embodiment of the present disclosure may include a display panel (not shown) which receives a signal and displays the same, a lamp (not shown) which illuminates light to a display panel, and a projection lens (not shown) which adjusts a focus of the beam which passed through the display panel.

The display panel may be a translucent or semi-translucent LCD panel, the lamp may be an LED, and the projection lens may include a diverse combination of lens assemblies capable of focusing adjustment. The projector according to an embodiment may receive a signal from the processor 150 and display it on the display panel. The lamp may irradiate light to the display panel, and focus the image beam passing through the display panel using the projection lens, to display the work area to the user. However, this is merely an example, and the projector can be implemented by a projector of a wide variety of types, and the beam can be irradiated to a region corresponding to a work area. As an example, the projector may be implemented as a detachable projector.

In addition, the projector according to an example embodiment may include a hologram device (not shown) and may provide a hologram to the workspace of the smart machine based on the signal received from the processor 150.

The speaker 180 may refer, for example, to a component for outputting various kinds of audio data, various kinds of notification sounds, voice messages, and the like. For example, if the electronic device 100 senses the user and the user is identified as being located in the work area of the smart machine according to the detection result, the speaker 180 may output a notification. However, this is merely an example, and if the sensed user is identified as being located within a predetermined distance in the work area, the processor 150 may control the speaker 180 to output an alarm sound.

The input unit (not shown) may include various input circuitry, such as, for example, and without limitation, a touch panel, a pen sensor, a key, a microphone, or the like, to receive various inputs. The touch panel may be configured by combining the display 110 and a touch sensor (not shown), and the touch sensor may use, for example, and without limitation, at least one of an electrostatic type, a pressure sensitive type, an infrared type, an ultrasonic type, or the like. The touch panel not only has a display function but may also include a function of detecting a touch input position and a touch area as well as a touch input pressure and may include a function of detecting not only a real touch but also a proximity touch. The pen sensor may be implemented as part of the touch panel or may include a separate identification sheet. The key may include a physical button, an optical key or a keypad. The microphone may include at least one of an internal microphone and/or an external microphone.

The input unit may receive position information and work information of the smart machine according to user input. For example, if the user manually inputs the position information of the smart machine, the input unit may transmit the input information to the processor 150. In addition, when the user inputs work information of the smart machine through the input unit, the processor 150 may store the inputted work information in the storage 140.

Hereinbelow, the operations of the electronic device 100 will be described in greater detail below with reference to the various drawings.

Figure 3:
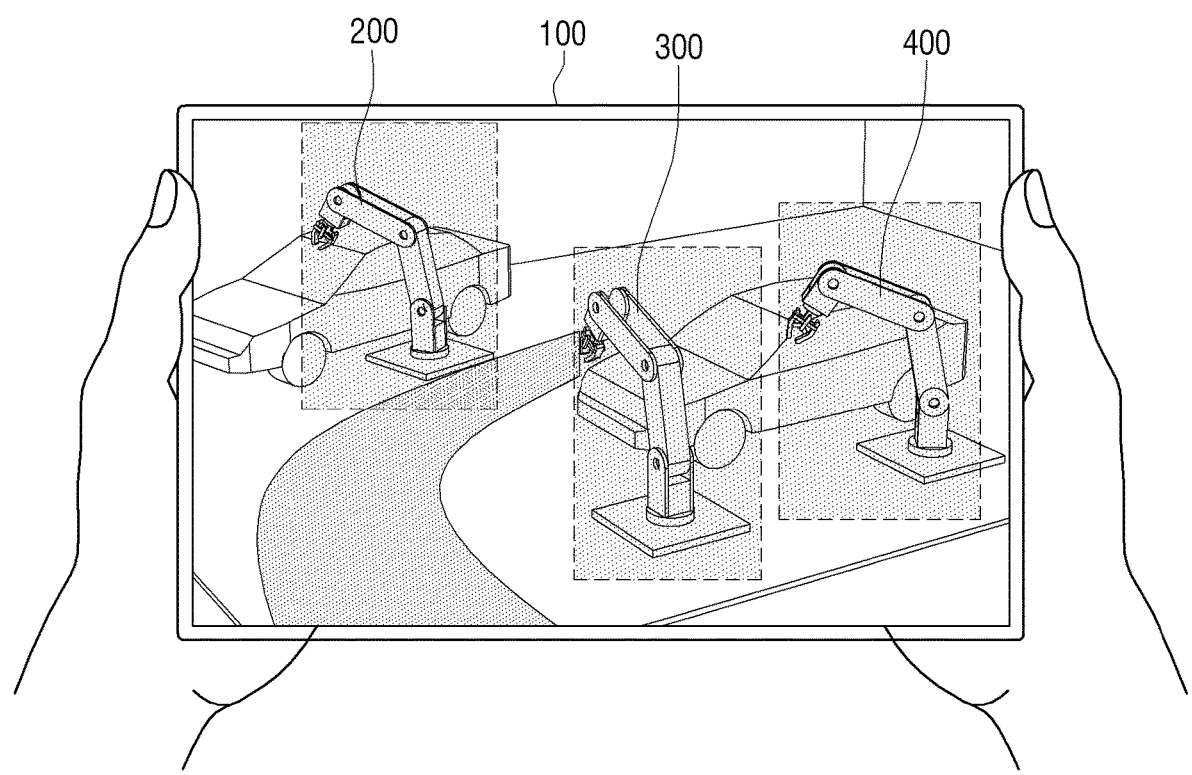
FIG. 3 is a diagram illustrating an example work area according to an example embodiment.

FIG. 3 is a diagram illustrating an example work area according to an example embodiment.

As shown in FIG. 3, the electronic device 100 may be implemented as a user terminal device. The electronic device 100 may obtain position information of the electronic device 100 through the sensor 130.

The electronic device 100, based on the position information of the electronic device 100 and the smart machine, may identify a smart machine located within a peripheral area of the electronic device 100. For example, the first to third machines 200, 300, and 400 can be identified.

The electronic device 100 may obtain the work information of each of the identified first to third smart machines 200, 300, and 400. The electronic device 100 may identify whether each of the first to third smart machines 200, 300, and 400 is operating based on the obtained operation information. For example, if the second and third smart machines 300 and 400 are identified as being in operation, the requested work area may be obtained according to the operation of the second and third smart machines 300 and 400.

The electronic device 100 according to an example embodiment of the present disclosure may provide an indication of a work area of a smart machine to an image photographed through the camera 120. Here, the image photographed through the camera 120 may be a pre-stored image, or may be an image received in real time through the camera 120.

The electronic device 100 according to an embodiment of the present disclosure may identify the smart machine based on the position information of the electronic device 100 and the photographing direction of the electronic device 100. For example, if the first through third smart machines 200, 300, and 400 are included in the image received in real time via the camera 120 according to the photographing direction of the electronic device 100, based on the work information of the first to third smart machines 200, 300 and 400, the work areas of the first to third smart machines 200, 300 and 400 can be indicated and displayed.

Here, the configuration for indicating the work area may refer, for example, to shading processing and color processing so that the work area is separated from the rest area in the image. For example, the area corresponding to the work area of the second smart machine 300 can be shaded in red and displayed. The electronic device 100 may inform the user that the shaded area in red color is a dangerous area.

The dangerous area according to another embodiment of the present disclosure may be changed according to the setting of the user. As an example, the electronic device 100 may provide a UI for setting a safety level. If the highest level is set at the safety level divided into upper, middle, and lower levels, a 1-2 m area can be added to the work area 20 of the smart machine to indicate the dangerous area (see, e.g., FIG. 9). The electronic device 100 may not only consider the work area of the smart machine, but may also indicate the danger area by considering the safety level. The 1-2 m is merely an example, and it is not limited thereto, and it is needless to say that various changes may be made according to the purpose.

The electronic device 100 may also indicate and provide information about the non-operational smart machine to the image. For example, if the first smart machine 200 is identified as not operating, the electronic device 100 may make the peripheral area of the first smart machine 200 or the area corresponding to the work area according to the operation of the first smart machine 200 in green color so that the area is divided from other areas. The electronic device 100 may make a user recognize that the area in green is a safe area.

Figure 4:
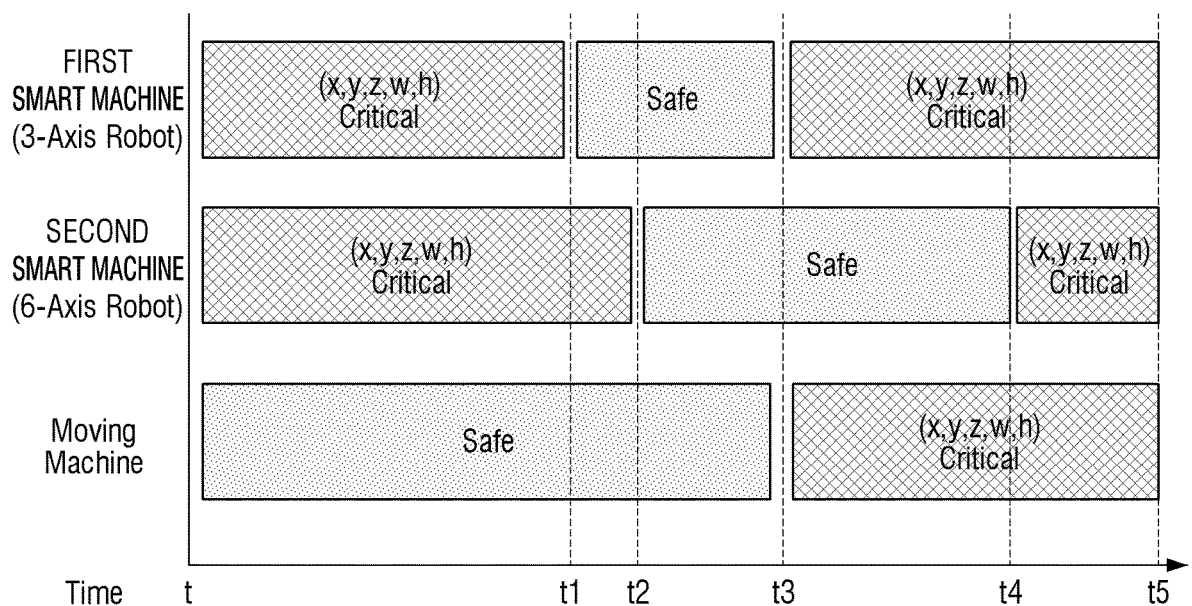
FIG. 4 is a diagram illustrating an example work schedule according to an example embodiment.

FIG. 4 is a diagram illustrating an example work schedule according to an example embodiment.

Referring to FIG. 4, the electronic device 100 may include work information of a smart machine, and the work information may include information on a work schedule of a smart machine and a job area required to perform an operation included in the work schedule.

Here, the work schedule may refer, for example, to a list of operations according to the time of the smart machine. As illustrated in FIG. 4, according to the work schedule, the first smart machine 200 performs an operation between a time t and a time t1, and the corresponding operation is performed when a region (w, h) is required at positions (x, y, z). Also, the second smart machine 300 is under stand-by without performing an operation at times t2 to t4, and may perform a required operation in which a region (w, h) is required at a position (x, y, z) from time t4 to t5.

The electronic device 100 may be configured to perform a plurality of operations based on a work schedule for each of a plurality of smart machines and information on a work area required to perform an operation included in the work schedule, and can identify the work area (or space) required to perform the operation.

For example, the first to third smart machines 200, 300, and 400 may be disposed in a factory, and the electronic device 100 may include work information for each of the first to third smart machines 200, 300, 400. The electronic device 100 may identify a required work area as each of the first to third smart machines 200, 300, and 400 operates at tx based on the work information. Here, since the work area is an area where the smart machine is operated, it may refer, for example, to a dangerous area where the user's access is restricted.

FIG. 5 is a diagram illustrating an example method for providing a work area according to an example embodiment.

Referring to FIG. 5, the work information of the smart machine can be input manually or automatically. The manual input method according to the example embodiment may include, based on whether the smart machine is fixed, maximum/minimum output torque of the smart machine, maximum/minimum speed of the smart machine, types of operations (grab, pierce, release, move, tec.), and required time for each operation, generating and storing work information of the smart machine based on the input data. In the meantime, it is merely an example and it is not necessary that all the data is input, and the electronic device 100 may generate a work schedule based on input data and data received from the server.

The automatic input method according to another embodiment of the present disclosure may be a method of receiving and storing work information of a smart machine from a server. For example, when the product name of the smart machine is input, it is possible to receive the operation information corresponding to the product name. However, the present disclosure is not limited thereto. In another embodiment, when an image photographed by the smart machine through the camera 120 for a predetermined time or more is received, the electronic device 100 may analyze the image to generate work information. By analyzing the image, and acquiring at least one of the operation of the smart machine, the time required for the operation, and the waiting time between the operations, the work information can be generated.

Figure 6:
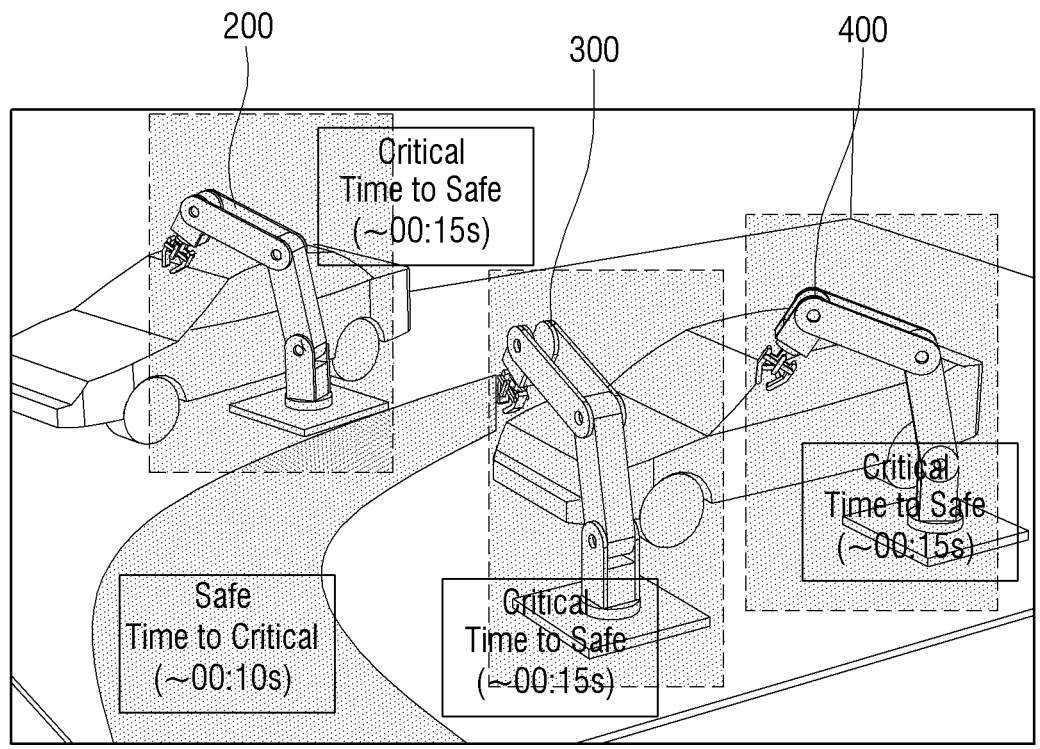
FIG. 6 is a diagram illustrating an example electronic device according to another example embodiment.

FIG. 6 is a diagram illustrating an example electronic device according to another example embodiment.

Referring to FIG. 6, the electronic device 100 may provide additional information in addition to indicating and providing the work area to the photographed image.

As a non-limiting example, if a smart machine is identified as being operational based on a work schedule, the electronic device 100 may provide information about the time remaining until the operation ends on the photographed image. For example, as illustrated in FIG. 6, "time to safe" indicating the remaining time until the dangerous area becomes a safe zone can be displayed as the operation is terminated.

Also, if the electronic device 100 is identified as not being in operation, the electronic device 100 may provide information about the time remaining until the operation of the smart machine is started. For example, as shown in FIG. 6, the "time to critical" indicating the remaining time until the safety area becomes a dangerous area can be displayed as the operation is started.

The electronic device 100 according to an embodiment of the present disclosure may display information about an operation when a user input to the displayed information is received. For example, if information about the time remaining until the smart machine starts to operate according to user input is touched, the electronic device 100 may display a description of the operation, the area (or space) required for the smart machine to perform the operation, and the like.

Figure 7:
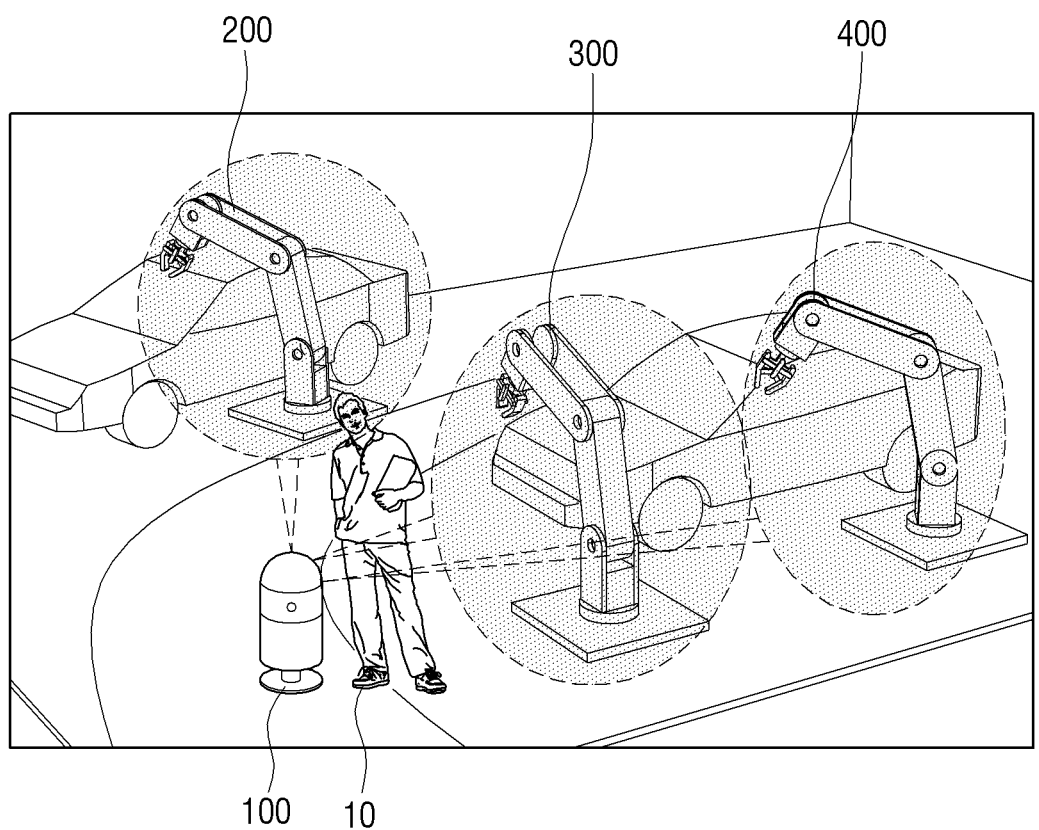
FIGS. 7 and 8 are diagrams illustrating an example electronic device according to another example embodiment.
Figure 8:
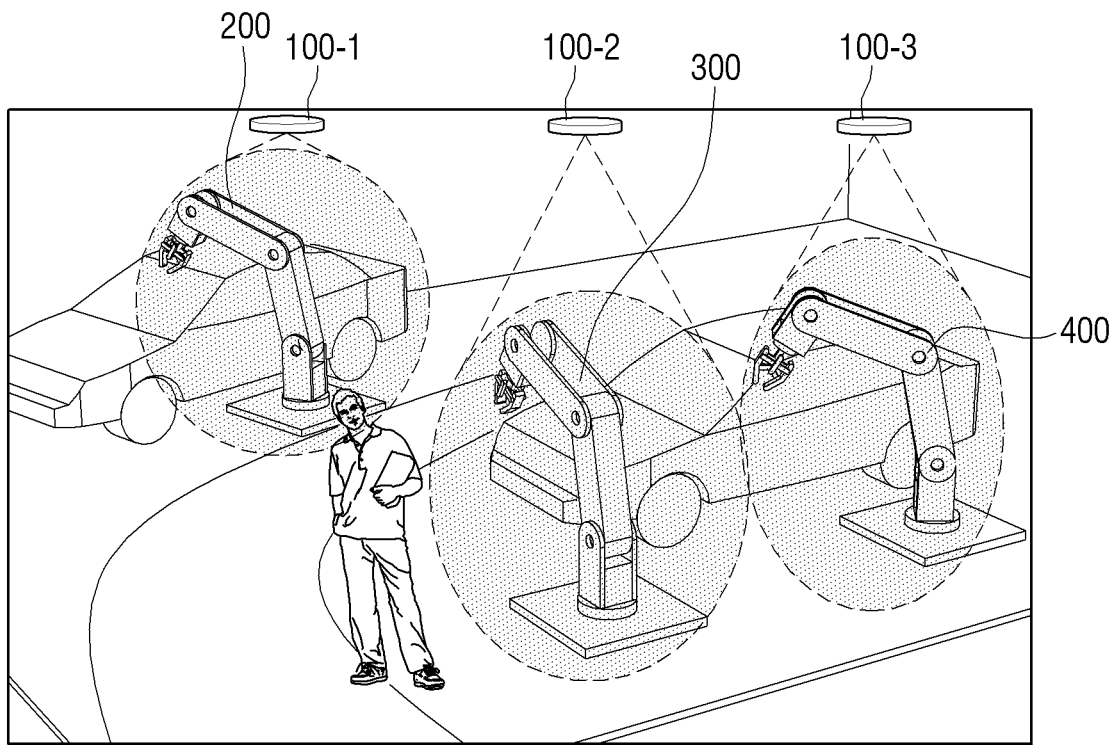

FIGS. 7 and 8 are diagrams illustrating an example electronic device according to another example embodiment.

Referring to FIG. 7, the electronic device 100 includes a driving unit 170, and may be implemented in a form capable of moving by itself by controlling the driving unit 170. The electronic device 100 may sense the user and may control the driving unit 170 to position the electronic device 100 within a predetermined distance from the sensed user.

When the position of the electronic device 100 is changed as the driving unit 170 is controlled, the electronic device 100 may identify the smart machine located in the peripheral area by reflecting the changed position in real time. In an example, if the electronic device 100 is moved from the first location to the second location, and a smart machine located in the peripheral region of the electronic device 100 is changed from the first smart machine 200 to the second and third smart machines 300, 400, the electronic device 100 may acquire work information of the second and third smart machines 300, 400.

The electronic device 100 may display an image indicating a work area of the second and third smart machines 300, 400.

The electronic device 100 according to an embodiment of the present disclosure may irradiate a beam to a work space according to work information using a projector. As illustrated in FIG. 7, the electronic device 100 includes a beam projector function, and based on the position information and work information of the first to third smart machines 200, 300, 400 from among the peripheral area of the electronic device 100, and may indicate the work area (or dangerous area) by irradiating beam to the work space.

Referring to FIG. 8, the electronic device 100 may be include a beam projector disposed in a ceiling of a specific space. The beam projector can illuminate the beam that indicates the work space of the smart machine.

As illustrated in FIG. 8, the first to third beam projectors 100-1, 100-2 and 100-3 may be arranged to correspond to the first to third smart machines 200, 300 and 400, respectively. However, the present disclosure is not limited thereto, and one beam projector may irradiate a plurality of beams to irradiate beam to a work space of each of the plurality of smart machines. The first through third beam projectors 100-1, 100-2, 100-3 may be connected to perform communication between the first through third beam projectors 100-1, 100-2, 100-3, and may be wirelessly connected or connected by wire to the body of the electronic device 100 as a component of the electronic device 100.

Figure 9:
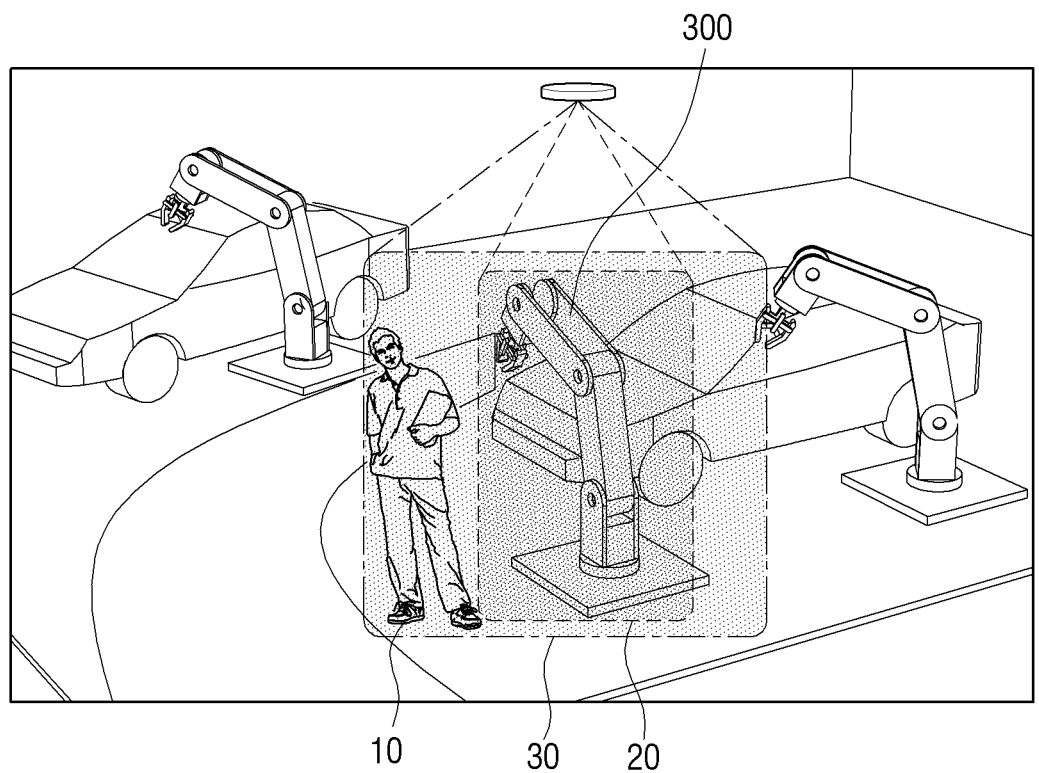
FIG. 9 is a diagram illustrating an example of a recognizable position according to an example embodiment.

FIG. 9 is a diagram illustrating an example of a recognizable position according to an example embodiment.

The smart machine according to an example embodiment of the present disclosure can be controlled based on the user's biological information such as motion recognition, voice recognition, and the like. As an example, if a "power off" voice command is received, the smart machine may be turned off.

The electronic device 100 according to an example embodiment may include information about the maximum distance between the smart machine and the user required for the smart machine to easily recognize the user's motion and voice. Here, the maximum separation distance may refer, for example, to a situation in which the smart machine cannot correctly recognize the motion, voice, etc. of the user who is distant from the smart machine by the maximum separation distance. For example, if the distance is more than 5 m from the smart machine, the smart machine may not easily identify the user's motion, voice, etc., and the error rate of the smart machine may increase. The electronic device 100 may indicate information about the maximum separation distance.

In an example, if the electronic device 100 is implemented as a user terminal device, the work area 20 of the second smart machine 300 is indicated to the image photographed through the camera, and the recognizable position 30 regarding at least one of the motion and voice can be indicated and provided.

As another example, when the electronic device 100 is embodied as a projector, the projector may irradiate the first beam to the work space along the work area 20 of the second smart machine 300, and irradiate the second beam with a space according to the recognizable position 30. Based on the irradiated first and second beams, the user can recognize that the area irradiated with the first beam is the dangerous area and the area irradiated with the second beam is the area where the user should be located.

Figure 10:
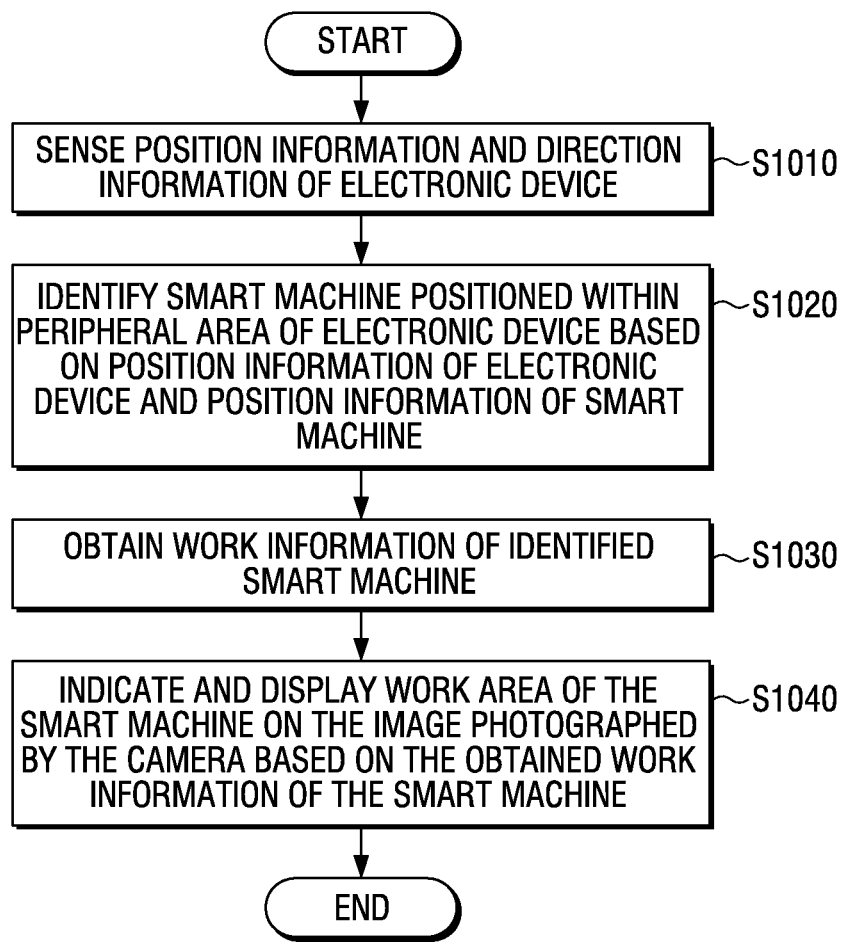
FIG. 10 is a flowchart illustrating an example controlling method of the electronic device according to an example embodiment.

FIG. 10 is a flowchart illustrating an example controlling method of the electronic device according to an example embodiment.

The electronic device storing the location information and the operation information of the smart machine according to an embodiment of the present disclosure detects the location information (e.g., position and direction information) of the electronic device (S1010).

The smart machine located within the peripheral area of the electronic device is identified based on the location information of the electronic device and the location information of the smart machine (S1020).

The work information of the identified smart machine is obtained (S1030).

The work area of the smart machine is indicated on the image photographed by the camera based on the obtained work information of the smart machine, and is displayed (S1040).

The operation of identifying S1020 may include identifying the smart machine based on a photographing direction of the electronic device which is detected using the position information of the electronic device and a sensor.

The work information of the smart machine according to an example embodiment may include information on a work area required for performing an operation included in a work schedule of a smart machine, and the method may include identifying whether the smart machine is operating based on the work schedule of the smart machine, and the displaying (S1040) includes, if it is identified that the smart machine is operating, indicating and providing a work area corresponding to the operations of the smart machine based on information on the work area.

In this case, if the smart machine is identified as being in operation, the displaying (S1040) may display information on a remaining time until the operation of the smart machine ends based on the work schedule, and if it is identified that the smart machine is not operating, may display information on remaining time until the smart machine starts operation.

In addition, the work information may include at least one of an operation of a smart machine obtained by analyzing an image photographed by the smart machine for a predetermined time, a time required for the operation, and a stand-by time between operations.

A control method according to an example embodiment may include irradiating a first beam to a work space of a smart machine based on work information of the identified smart machine.

The method may further include the operation of irradiating a second beam guiding a recognizable position of at least one of a user's motion and voice based on distance information that the smart machine can recognize at least one of the user's motion and voice.

The control method according to an embodiment may also include moving the body of the electronic device such that the electronic device is located within a predetermined distance from the user of the electronic device, the step (S1020) of identifying includes, when the location information is changed, identifying the smart machine located in the peripheral area of the electronic device based on the changed location information.

Also, displaying S1040 may display a UI that guides the recognizable location of at least one of the user's motion and voice based on distance information from which the smart machine can recognize at least one of the user's motion and voice.

The electronic device according to an embodiment may include coordinate information indicating coordinates of each position of a specific space, and the coordinate information of the electronic device includes information indicating coordinates of the position of the electronic device disposed in the specific space based on the coordinate information, and the location information of the smart machine may be information indicating the location of the smart machine disposed in the specific space based on the coordinate information.

The various example embodiments described above may be embodied in a non-transitory recording medium which can be read by a computer or a similar device using software, hardware, or any combination thereof. In some cases, the example embodiments described herein may be implemented by the processor itself. According to a software implementation, embodiments such as the procedures and functions described herein may be implemented in separate software modules. Each of the software modules may perform one or more of the functions and operations described herein.

Meanwhile, computer instructions for performing the processing operations according to various example embodiments of the present disclosure described above may be stored in a non-transitory computer-readable medium. Computer instructions stored in such non-transitory computer-readable media may cause a particular device to perform processing operations according to various example embodiments described above when executed by a processor.

The non-transitory computer readable medium may refer, for example, to a medium that stores data semi-permanently, and is readable by an apparatus. Examples of the non-transitory computer readable medium may include, for example, and without limitation, a compact disc (CD), a digital versatile disk (DVD), a hard disk, a Blu-ray disk, a universal serial bus (USB), a memory card, a ROM, or the like.

The foregoing example embodiments and advantages are merely examples and are not to be understood as limiting. The present disclosure can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic device comprising:
    a display;
    a camera;
    a sensor;
    a storage configured to store position information and work information of a smart machine, wherein the work information of the smart machine comprises a work schedule of the smart machine and information on a work area required to perform operations included in the work schedule; and
    a processor configured to:
    identify a smart machine located within a peripheral area of the electronic device based on position information of the electronic device sensed through the sensor and position information of the smart machine stored in the storage;
    obtain the work information of the identified smart machine from the storage;
    identify whether the smart machine is operating, based on the work schedule of the smart machine;
    indicate the work area corresponding to the operations of the smart machine on an image captured through the camera based on the obtained work information of the smart machine;
    based on identifying that the smart machine is operating, provide the image including the work area and information on remaining time until the operations of the smart machine will end based on the work schedule on the display; and
    based on identifying that the smart machine is not operating, provide the image including the work area and information on remaining time until operations of the smart machine will start in the work area of the smart machine on the display.

2. The electronic device of claim 1, wherein the processor is configured to identify the smart machine based on position information of the electronic device and an image capturing direction of the electronic device sensed through the sensor.

3. The electronic device of claim 1, wherein the processor is further configured to: indicate another work area on the image simultaneously with the indicated work area, and provide information on a remaining time until operations of the smart machine or another smart machine will start in the other work area.

4. The electronic device of claim 1, wherein the processor is configured to simultaneously indicate a plurality of work areas on the image, each work area corresponding to a different smart machine, and indicate, for each work area, a remaining time until operations of the respective smart machine are complete in the work area or a remaining time until operations of the respective smart machine will start in the work area.

5. The electronic device of claim 1, wherein the work information comprises information on at least one of: an operation of the smart machine obtained by analyzing an image of the smart machine captured during a predetermined time, required time for the operation, and stand-by time between the operations.

6. The electronic device of claim 1, further comprising:
    a projector,
    wherein the processor is configured to control the projector to irradiate first beam to a work space of the smart machine based on work information of the identified smart machine.

7. The electronic device of claim 6, wherein the processor is configured to control the projector to irradiate a second beam which guides a recognizable position regarding at least one of a motion and voice of a user based on information of a distance that the smart machine is capable of recognizing at least one of the motion or voice.

8. The electronic device of claim 1, further comprising:
    a driving unit comprising driving circuitry configured to move a main body of the electronic device,
    wherein the processor is configured to:
    control the driving unit to position the electronic device within a predetermined distance from a user of the electronic device, and
    identify a smart machine located within a peripheral area of the electronic device in response to position information of the electronic device being changed according to control of the driving unit.

9. The electronic device of claim 1, wherein the processor, based on information of a distance that the smart machine is capable of recognizing at least one of a user's motion and voice, is configured to provide a UI for guiding a recognizable position of at least one of the user's motion and voice.

10. The electronic device of claim 1, wherein the storage is configured to include coordinate information which indicates each position of a specific space,
    wherein position information of the electronic device includes information indicating a position of the electronic device disposed within the specific space based on the coordinate information, and
    wherein position information of the smart machine includes information indicating a position of the smart machine disposed within the specific space based on the coordinate information.

11. A controlling method of an electronic device storing position information and work information of a smart machine in a storage, the work information of the smart machine comprising a work schedule of the smart machine and information on a work area required to perform operations included in the work schedule, the method comprising:
    sensing position information of the electronic device through a sensor;
    identifying a smart machine located within a peripheral area of the electronic device based on the position information of the electronic device sensed through the sensor and position information of the smart machine stored in the storage;
    obtaining the work information of the identified smart machine from the storage;
    identifying whether the smart machine is operating, based on the work schedule of the smart machine;
    indicating the work area corresponding to the operations of the smart machine in an image captured through a camera based on the obtained work information of the smart machine;
    based on identifying that the smart machine is operating, displaying the image including the work area and information on remaining time until the operations of the smart machine will end based on the work schedule; and based on identifying that the smart machine is not operating, displaying the image including the work area and information on remaining time until operations of the smart machine will start in the work area of the smart machine.

12. The method of claim 11, wherein the identifying the smart machine comprises identifying the smart machine based on position information of the electronic device and an image capturing direction of the electronic device sensed through the sensor.

13. The method of claim 11, wherein the method further comprises indicating another work area on the image simultaneously with the indicated work area, and providing information on a remaining time until operations of the smart machine or another smart machine will start in the other work area.

14. The method of claim 11, wherein the method includes indicating a plurality of work areas on the image, each work area corresponding to a different smart machine, and indicating, for each work area, a remaining time until operations of the respective smart machine are complete in the work area or a remaining time until operations of the respective smart machine will start in the work area.

15. The method of claim 11, wherein the work information comprises information on at least one of: an operation of the smart machine obtained by analyzing an image of the smart machine captured during a predetermined time, required time for the operation, and stand-by time between the operations.

16. The method of claim 11, further comprising:
irradiating first beam to a work space of the smart machine based on work information of the identified smart machine.

17. The method of claim 16, further comprising:
irradiating a second beam which guides a recognizable position regarding at least one of a motion and voice of a user based on information of a distance that the smart machine is capable of recognizing at least one of the motion or voice.

18. The method of claim 11, further comprising:
moving a main body of the electronic device to position the electronic device within a predetermined distance from a user of the electronic device,
wherein the identifying comprises, in response to position information of the electronic device being changed according to control of a driving unit comprising driving circuitry configured to move the main body, identifying a smart machine located at a peripheral area of the electronic device.

19. The method of claim 11, wherein the displaying comprises, based on information of a distance that the smart machine is capable of recognizing at least one of a user's motion and voice, displaying a UI for guiding a recognizable position of at least one of the user's motion and voice.

20. The method of claim 11, wherein the electronic device comprises coordinate information indicating each position of a specific space as coordinates,
wherein position information of the electronic device includes information indicating a position of the electronic device disposed within the specific space based on the coordinate information, and
wherein position information of the smart machine includes information indicating a position of the smart machine disposed within the specific space based on the coordinate information.

* * * * *